US011983814B2

(12) United States Patent
Sato et al.

(10) Patent No.: US 11,983,814 B2
(45) Date of Patent: May 14, 2024

(54) IMAGE PROCESSING APPARATUS THAT GENERATES MODEL OF OBJECT, IMAGE PROCESSING METHOD, AND STORAGE MEDIUM STORING PROGRAM THEREOF (71) Applicant: CANON KABUSHIKI KAISHA, Tokyo (JP)

(72) Inventors: Shogo Sato, Kanagawa (JP); Naohito Nakamura, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 101 days.

(21) Appl. No.: 17/579,402

(22) Filed: Jan. 19, 2022

(65) Prior Publication Data
US 2022/0230393 A1 Jul. 21, 2022

(30) Foreign Application Priority Data
Jan. 21, 2021 (JP) .................... 2021-007958

(51) Int. Cl.
G06T 17/20 (2006.01)
G06T 7/73 (2017.01)
G06V 10/25 (2022.01)

(52) U.S. Cl.
CPC ........... G06T 17/20 (2013.01); G06T 7/75 (2017.01); G06V 10/25 (2022.01); G06T 2210/21 (2013.01)

(58) Field of Classification Search
CPC .... G06T 7/70; G06T 7/73; G06T 7/75; G06T 2207/10028; G06F 18/00; G06V 10/25; G06V 30/147
See application file for complete search history.

(56) References Cited

U.S. PATENT DOCUMENTS

2008/0259078 A1* 10/2008 Dokken .............. G06F 30/00
345/423
2019/0066388 A1* 2/2019 Nakagawa ............ G06T 19/006

FOREIGN PATENT DOCUMENTS

| CN | 109658525 A | * | 4/2019 | ............. G06T 15/04 |
| JP | 2015082288 A | | 4/2015 | |
| JP | 2016071645 A | | 5/2016 | |
| JP | 2019046096 A | | 3/2019 | |

OTHER PUBLICATIONS

Strecke, Michael, and Jorg Stuckler. "Where does it end?—reasoning about hidden surfaces by object intersection constraints." Proceedings of the IEEE/CVF Conference on Computer Vision and Pattern Recognition (Year: 2020).*

(Continued)

Primary Examiner — Diane M Wills
(74) Attorney, Agent, or Firm — Canon U.S.A., Inc., IP Division (57) ABSTRACT An image processing apparatus includes a detection unit that detects an area of a target object from an image captured by an image capturing apparatus, a first model generation unit that generates a front surface model representing a front surface of the target object based on the area of the target object, and a second model generation unit that generates a back surface model representing a back surface of the target object based on points provided by movement of a plurality of points on the front surface model by a distance corresponding to a thickness of the target object in respective normal directions.

14 Claims, 7 Drawing Sheets (56) References Cited

OTHER PUBLICATIONS

Nicastro, Andrea, Ronald Clark, and Stefan Leutenegger. "X-section: Cross-section prediction for enhanced RGB-D fusion." Proceedings of the IEEE/CVF International Conference on Computer Vision. (Year: 2019).*

Lewis, et al. "Pose space deformation. A unified approach to shape interpolation and skeleton-driven deformation", Proceedings of SIGGRAPH 2000, pp. 165-172, Jul. 2000.

* cited by examiner

IMAGE PROCESSING APPARATUS THAT GENERATES MODEL OF OBJECT, IMAGE PROCESSING METHOD, AND STORAGE MEDIUM STORING PROGRAM THEREOF

BACKGROUND

Field

The present disclosure relates to an image processing technique for generating a model of an object.

Description of the Related Art

In recent years, studies relating to mixed reality (MR) where virtual space information overlaps real space in real time to present a resultant image to a user have been conducted. In mixed reality, a combined image provided by superimposition of a virtual space image (computer graphics (CG)) on an entire real video image or a part of a real video image captured by an image capturing apparatus such as a head-mounted display (HMD) is displayed. The virtual space image to be superimposed is provided based on a position and orientation of the image capturing apparatus.

In this case, a virtual object is not displayed in a certain real object area in a captured image area depending on a distance between the real object and the virtual object, so that a sense of distance between the objects can be represented. For example, a user wearing an HMD can hold a real object such as the user's hand and a tool over a virtual object. In such a case, if the virtual object is not rendered in an area of the hand or the tool on a captured image, the hand or the tool is displayed as if it is present in front of the virtual object. Accordingly, the user grasps a positional relation between the virtual object and the real object more easily, and verification of work using the real hand or the tool in the virtual space is facilitated.

Detection of the real object area and measurement of a distance to the real object are necessary to accurately represent a positional relation between the real object and the virtual object. However, even if a distance measurement device attached to the HMD measures a distance to the real object, only a depth to a front surface of the real object is acquired and a depth to a back surface of the real object cannot be acquired. For example, contact between a real hand and a CG model in mixed reality can be determined. In such a case, even if a distance from an image capturing apparatus to a front surface of the real hand is measured, there is an issue that contact between the CG model and a back surface of the hand in actual contact with the CG model is not accurately determined. For this reason, a method for more accurately determining contact between a real object and a CG model is needed.

For example, in Japanese Patent Application Laid-Open No. 2015-82288, in a case where depths are estimated using viewpoints of a plurality of cameras, a method by which depths of points that cannot be associated between images are estimated from depths of points that can be associated is used. In non-patent document entitled "Pose space deformation: A unified approach to shape interpolation and skeleton-driven deformation", by J. P. Lewis, Matt Cordner, and Nickson Fong. Proceedings of SIGGRAPH 2000, pp. 165-172, (July 2000), a CG model of a body or hand is used to add thickness to a joint acquired by motion capture. The CG model to be used herein is prepared beforehand.

Japanese Patent Application Laid-Open No. 2016-71645 discusses a method for recovering a three-dimensional model of a large area including not only a front area but also a side area based on a depth image. In Japanese Patent Application Laid-Open No. 2019-46096, a back surface polygon is generated at a position where a front surface polygon of a hand is projected in a normal direction. If the back surface polygon is provided outside the front surface polygon at the time of projection of the back surface polygon, a vertex of such a back surface polygon is moved in a line-of-sight direction.

In Japanese Patent Application Laid-Open No. 2015-82288, although a depth can be estimated with respect to an area on which matching cannot be performed between a plurality of cameras, a depth of an area that cannot be seen by all of cameras cannot be estimated. In the aforementioned paper by Lewis, et al., positions, thicknesses, and lengths of the CG model and the real object are difficult to be matched if the model is reconstructed based on a joint position acquired by motion capture. Consequently, there is an issue that a difference in appearance between the CG model and the real object occurs in mixed reality. In addition, Japanese Patent Application Laid-Open No. 2016-71645 is based on the premise that voxels are used. In a case where a depth of a model is estimated with good accuracy, fine voxels need to be used. For this reason, there is an issue that a large volume of memory and a large amount of time are necessary to generate a depth model. In Japanese Patent Application Laid-Open No. 2019-46096, in a case where normals of vertexes of front surface polygons are provided inward, positions of back surface polygons are inverted due to intersection with adjacent vertexes. This may cause inconsistency in polygon shape. In such a case, the accuracy of determination of contact between the real hand and the CG model is affected. Thus, if a user looks around a shape of the real hand in a moment where the real hand contacts the CG model, the user feels strangeness about appearance.

In mixed reality, a CG model can be operated while a user's hand is being displayed. In such a case, a stereo camera or a depth sensor is used to model the user's hand, and determination of contact between the modeled hand and the CG model needs to be made at high speed while a front-rear relation between the modeled hand and the CG model is being represented. In this case, when the modeled hand is to be displayed, a live-action hand image overlaps a display position, so that the user feels as if the user operates the CG model with a real hand. A difference in shape between the modeled hand and the real hand causes a difference in appearance between the modeled hand and a real video image. This causes the user to have a feeling of strangeness. A distance measurement device attached to a HMD can be used to model only a front surface of an object. In such a case, since a thickness of the object cannot be considered, there are issues that determination of contact between the modeled object and a CG model is not accurately made, and such determination causes the user to have a feeling of strangeness.

SUMMARY

Aspects of the present disclosure are directed to generation of a real-object model that has an appearance that does not cause a user to have a feeling of strangeness while enabling operation of a CG model.

An image processing apparatus includes a detection unit configured to detect an area of a target object from an image captured by an image capturing apparatus, a first model generation unit configured to generate a front surface model representing a front surface of the target object based on the area of the target object, and a second model generation unit configured to generate a back surface model representing a back surface of the target object based on points provided by movement of a plurality of points on the front surface model by a distance corresponding to a thickness of the target object in respective normal directions.

Further features will become apparent from the following description of exemplary embodiments with reference to the attached drawings.

DESCRIPTION OF THE EMBODIMENTS

Exemplary embodiments are described below with reference to the drawings.

A first exemplary embodiment will now be described.

Figure 1:
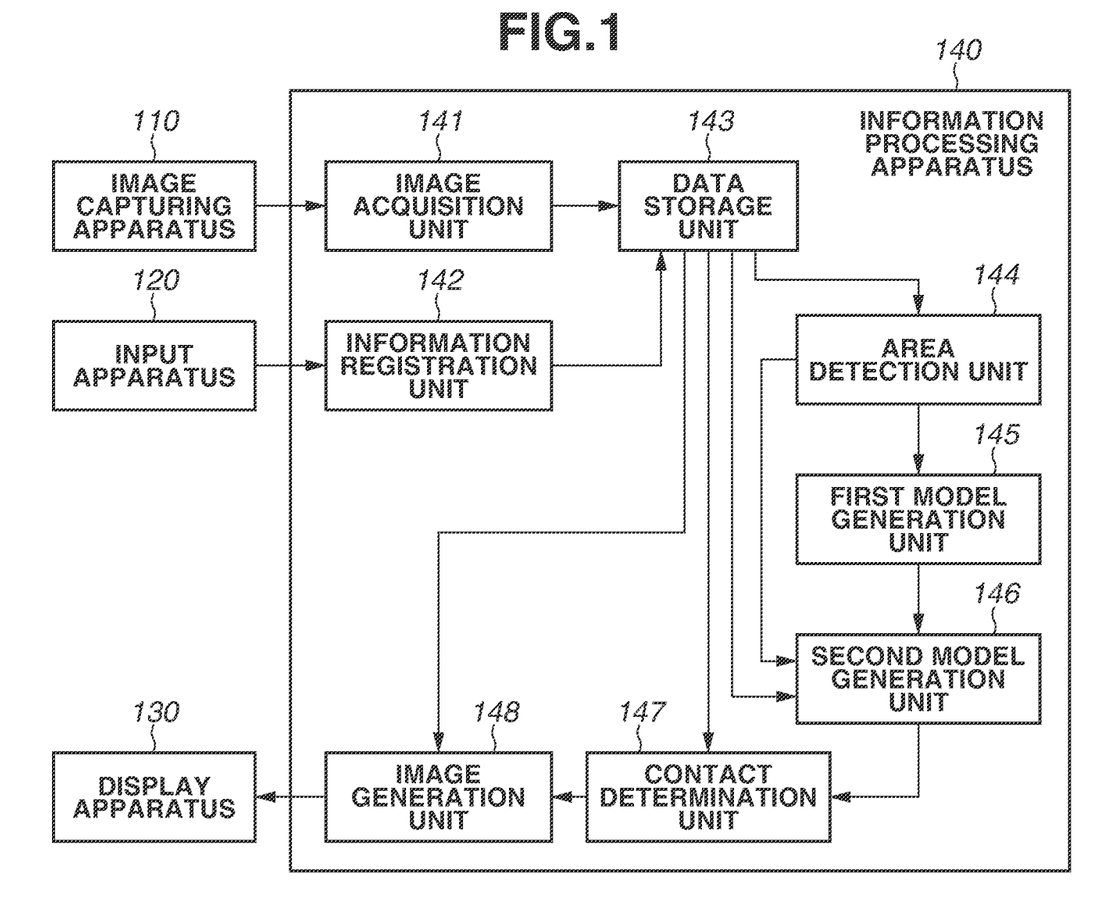
FIG. 1 is a diagram illustrating an example of a system configuration.

FIG. 1 is a block diagram illustrating a configuration example of an information processing apparatus 140 configured to control an image capturing apparatus 110 according to the present exemplary embodiment. In the present exemplary embodiment, the image capturing apparatus 110, an input apparatus 120, and a display apparatus 130 are connected to the information processing apparatus 140. The image capturing apparatus 110 has a stereo configuration. For example, the image capturing apparatus 110 is an image capturing camera disposed in a video see-through head-mounted display (HMD), while the display apparatus 130 is a display such as an HMD and a personal computer (PC) monitor.

The information processing apparatus 140 is a computer that includes, for example, a processor, a memory, a storage device that stores an operating system (OS) and an application program, and an interface that communicates with an external apparatus. The information processing apparatus 140 includes an image acquisition unit 141, an information registration unit 142, a data storage unit 143, an area detection unit 144, a first model generation unit 145, a second model generation unit 146, a contact determination unit 147, and an image generation unit 148. Each of these functional units can be entirely implemented by software, or partially implemented by hardware.

The image acquisition unit 141 acquires a captured image captured by the image capturing apparatus 110, and stores the acquired captured image in the data storage unit 143. The information registration unit 142 stores information about a real object to be a model target in the data storage unit 143. The information about the real object is input from the input apparatus 120. The information registration unit 142, for example, stores thickness information about the real object to be the model target in the data storage unit 143. The thickness information about the real object is input from the input apparatus 120. The data storage unit 143 stores, for example, the captured image acquired by the image acquisition unit 141 and the information input from the information registration unit 142.

The area detection unit 144 detects an area of the real object to be the model target from the captured image stored in the data storage unit 143. For example, the area detection unit 144 can detect a certain color area within an image as a real object area by using a color dictionary in which real object colors are registered, or can detect a target object area based on characteristics learned by machine learning. Any method can be employed as long as an area of a real object to be a model target can be detected from a captured image.

The first model generation unit 145 generates a three-dimensional model of the real object of the model target based on the detection area detected by the area detection unit 144. The first model generation unit 145, for example, determines corresponding points on an outline of a detection area of a stereo image to perform stereo matching, thereby generating a three-dimensional polygon model of the target. The three-dimensional model generated by the stereo matching serves as a thin front surface model that does not have a thickness in a line-of-sight direction in the image capturing apparatus 110. In a case where the three-dimensional model is projected onto the captured image, the projected model matches the detection area.

The second model generation unit 146 adds thickness to the front surface model generated by the first model generation unit 145 based on thickness information (a thickness parameter) registered in the data storage unit 143 such that appearance of the front surface model at the time of projection onto the captured image remains unchanged. The second model generation unit 146 generates a model having a thickness corresponding to the thickness information with respect to the front surface model, which does not have a thickness in a line-of-sight direction in the image capturing apparatus 110.

The contact determination unit 147 determines contact between the CG model stored in the data storage unit 143 and a real-object model that has thickness and is generated by the second model generation unit 146. The contact determination can be made by any determination method such as a boundary volume hierarchical structure and a Gilbert-Johnson-Keerthi (GJK) method. In this case, collision response can be performed to the CG model such that the models do not dig into each other, or an operation on the CG model can be performed upon the contact as a trigger.

The image generation unit 148 generates an image by superimposing the CG model calculated by the contact determination unit 147, the model of the real object of the model target and having thickness, and the captured image stored in the data storage unit 143, and outputs the generated image to the display apparatus 130. The image generation unit 148 displays the CG model, the model of the real object, and the captured image stored in the data storage unit 143 on the display apparatus 130 in a superimposed manner In this case, first, the captured image is rendered on a background. Next, a depth test is enabled, and the model of the real object and having a transparent thickness is rendered. Lastly, the CG model is rendered. In this way, at a position of the model of the real object, the image of the real object can be superimposed.

Figure 2:
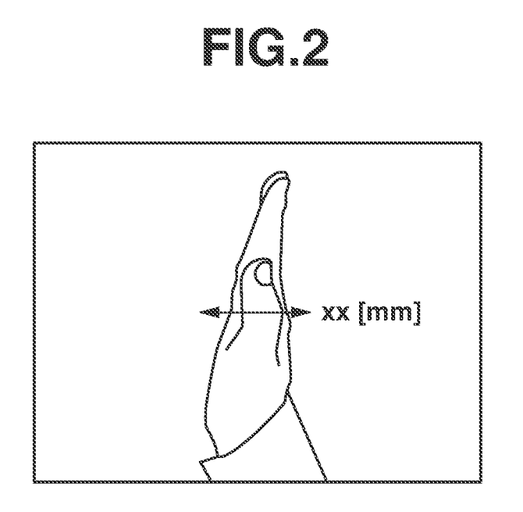
FIG. 2 is a diagram illustrating an example of a thickness information registration method.

A feature of the present exemplary embodiment is two types of processing that is executed by the information registration unit 142 and the second model generation unit 146. In the information registration unit 142, a thickness of a model to be a target is input from a user interface (UI). A thickness of a model can be input using a keyboard or a mouse as part of thickness registration. Alternatively, an image of a real object of a model target can be captured by a stereo camera to determine a thickness by stereo matching. In such a case, the determined thickness is input. For example, as illustrated in FIG. 2, an image of a real object of a model target is captured, and a width of a front surface model generated by the first model generation unit 145 is set as a thickness.

Figure 3:
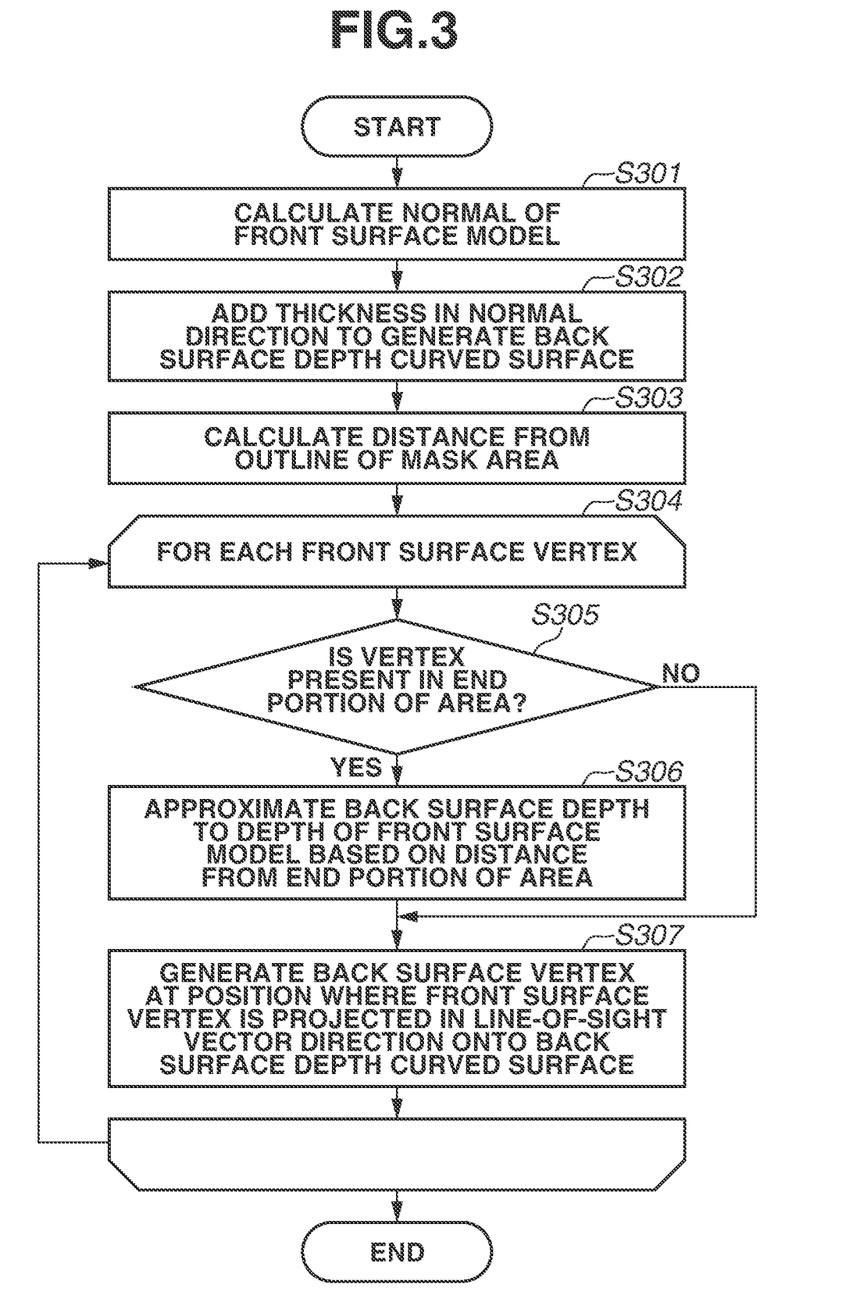
FIG. 3 is a flowchart illustrating an example of processing performed by a second model generation unit according to a first exemplary embodiment.
Figure 4A:
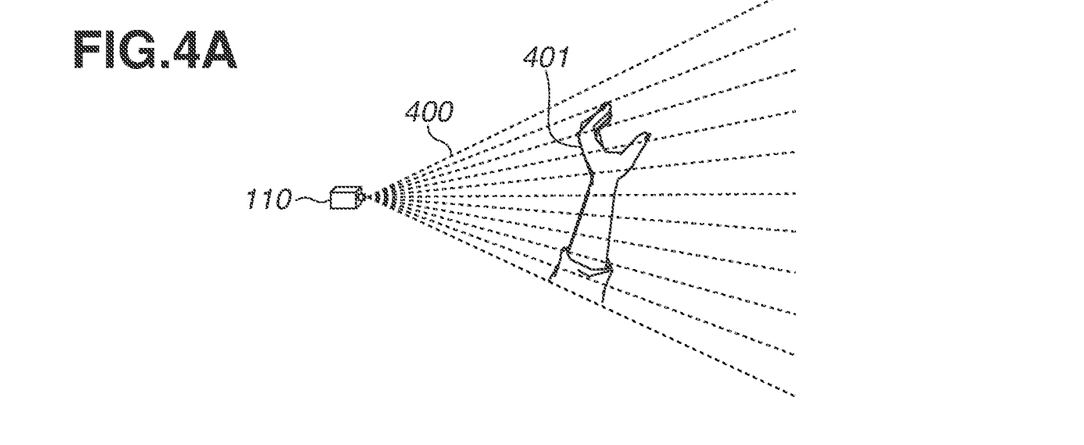
FIGS. 4A to 4C are diagrams illustrating model generation according to the first exemplary embodiment.
Figure 4B:
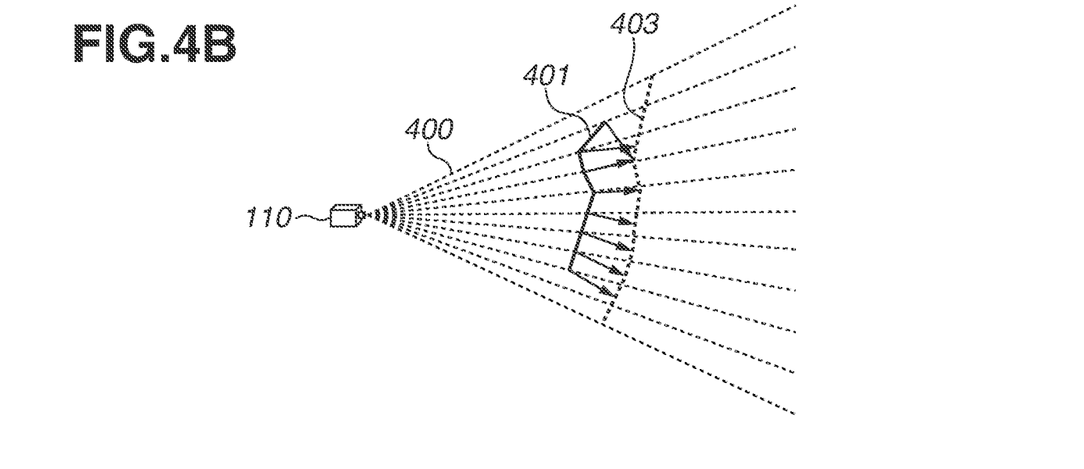
Figure 4C:
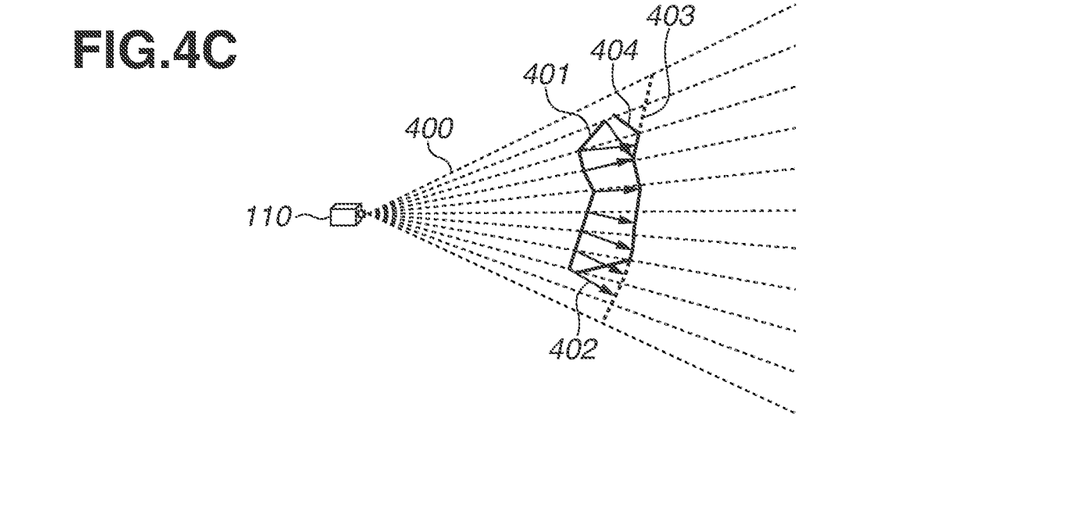

FIG. 3 is a flowchart illustrating an example of processing performed by the second model generation unit 146 according to the present exemplary embodiment. The processing in FIG. 3 is executed by the second model generation unit 146 of the information processing apparatus 140. Herein, the processing in FIG. 3 is described with reference to FIGS. 4A to 4C illustrating one example of a polygon generation method as appropriate.

In step S301, the second model generation unit 146 calculates a normal of the front surface model generated by the first model generation unit 145. Particularly, the second model generation unit 146 determines a normal group 402 illustrated in FIG. 4B with respect to a front surface model 401 generated on an image of a front surface of an object captured by the image capturing apparatus 110 as illustrated in FIG. 4A. The normal to be calculated herein can be a plane normal that is calculated for each polygon plane of the front surface model, or a point normal that is calculated for each vertex. In each of FIGS. 4A to 4C, a line-of-sight vector 400 is illustrated. The line-of-sight vector 400 herein is a vector toward a vertex of the front surface model from an origin in view coordinates.

In step S302, the second model generation unit 146 projects a vertex of the front surface model by a length corresponding to the thickness information (the thickness parameter) acquired from the data storage unit 143 in a direction of each normal calculated in step S301. The second model generation unit 146 interpolates and/or extrapolates a vertex-projected position to generate a back surface depth curved surface 403 as illustrated in FIG. 4B.

For example, the second model generation unit 146 interpolates a back surface depth that is not derived from projection of a vertex of the front surface model, based on a gradient value of a back surface depth acquired by projection of the vertex of the front surface model. The back surface depth curved surface 403 can be represented as a set of discrete values like an image or a vector field, or represented as a parametric curved surface such as Bezier curved surface, a B-splines curved surface, and a non-uniform rational B-splines (NURBS) curved surface. As one example of the method for interpolating a vertex-projected position, a method such as linear interpolation, Lagrange interpolation, and spline interpolation can be employed. As one example of the method for extrapolating a vertex-projected position, extrapolation using linear extrapolation or a parametric curved surface can be used.

In step S303, the second model generation unit 146 determines a distance from an outline of a mask area that is acquired by the area detection unit 144. The second model generation unit 146 represents a distance from an outline by using, for example, Euclidian distance transform that is a map indicating a Euclidian distance from an outline. A distance from an outline can be represented by using a taxicab geometry that indicates a Manhattan distance from an outline, or a Chebyshev distance that indicates a distance of the maximum vector in a vector space.

Subsequent to the processing in step S304, the second model generation unit 146 performs processing in steps S305 to S307 to be described below for each vertex of the front surface model.

In step S305, the second model generation unit 146 uses the distance, which is from the outline and determined in step S303, to determine whether a given vertex (a vertex of a processing target) is present in an end portion of an area. In a case where the second model generation unit 146 determines that the given vertex is present in the end portion (YES in step S305), the processing proceeds to step S306. In a case where the second model generation unit 146 determines that the given vertex is not present in the end portion (NO in step S305), the processing proceeds to step S307.

As one example of the method for determining whether a vertex is present in an end portion, the second model generation unit 146 determines that a vertex is preset in an end portion in a case where a distance from an outline is less than or equal to a predetermined distance.

In step S306, the second model generation unit 146 approximates a depth of the back surface depth curved surface 403 to a depth of the front surface model based on a distance from the end portion of the area, as illustrated in FIG. 4C, to generate a corrected back surface depth curved surface 404. In this case, a ratio of approximation to the depth of the front surface model can be determined by, for example, linear approximation based on a distance from an end portion, or non-linear approximation using a function such as a quadric function and a logarithmic function.

In step S307, the second model generation unit 146 generates a back surface vertex at a position where a vertex of the front surface model is projected in a direction of the line-of-sight vector 400 onto the corrected back surface depth curved surface 404. Accordingly, the second model generation unit 146 generates the back surface vertex for each vertex of the front surface model based on the thickness information, thereby generating the back surface model of the real object of the model target.

According to the first exemplary embodiment, a model of a real object is generated in consideration of a thickness of a hand that is the real object of a model target. Therefore, the real-object model that enables operation of a CG model with high accuracy and that does not cause a user to have a feeling of strangeness even if the user looks around the real-object model can be generated at high speed.

A second exemplary embodiment will now be described.

In the above-described first exemplary embodiment, a back surface vertex is set at a position where a vertex of a front surface model is projected in a line-of-sight vector direction based on thickness information, so that a back curved surface is generated. In the second exemplary embodiment, a back surface vertex is generated at a position where a vertex of a front surface model is projected in a depth direction in a viewpoint coordinate system. In a case where the back surface vertex is outside the front surface, a back surface depth is adjusted to a front surface depth. Accordingly, a model having a thickness of a real object is generated. Since a configuration of an information processing apparatus of the second exemplary embodiment is similar to that of the first exemplary embodiment, description thereof is omitted.

Figure 5:
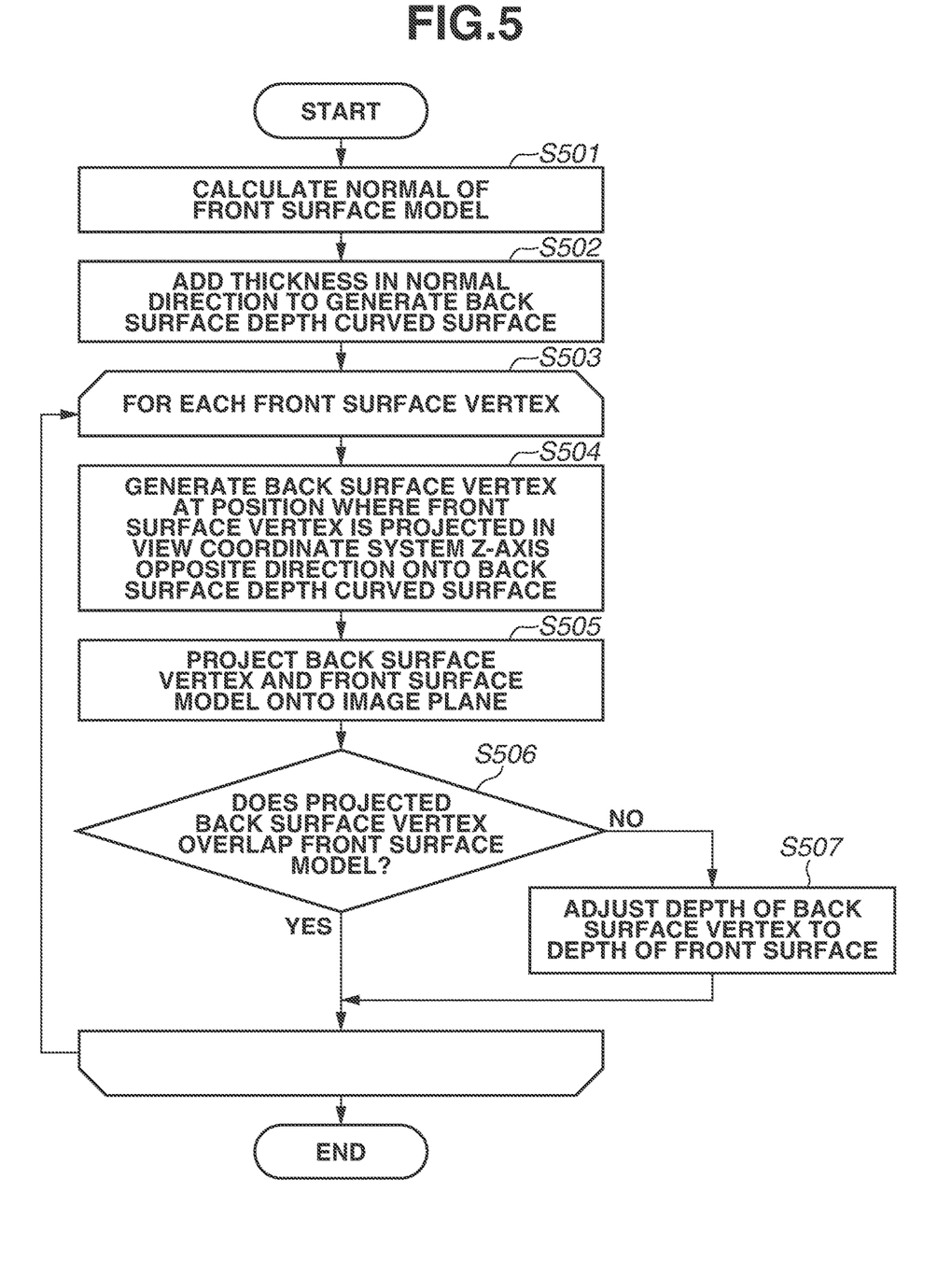
FIG. 5 is a flowchart illustrating an example of processing performed by a second model generation unit according to a second exemplary embodiment.

FIG. 5 is a flowchart illustrating an example of processing performed by a second model generation unit 146 according to the second exemplary embodiment. The processing illustrated in FIG. 5 is executed by the second model generation unit 146 of an information processing apparatus 140. Herein, the processing in FIG. 5 is described with reference to FIGS.

Figure 6A:
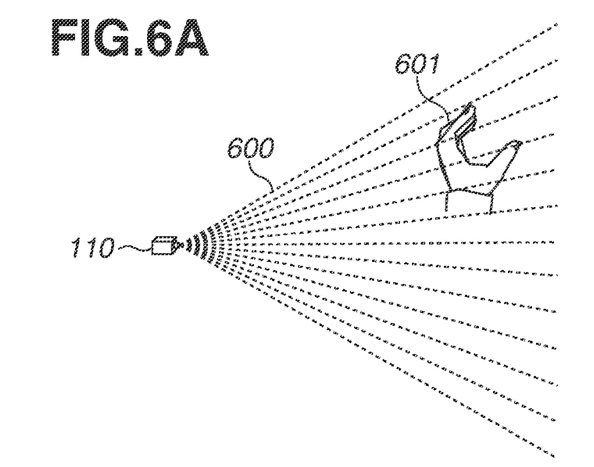
FIGS. 6A to 6D are diagrams illustrating model generation according to the second exemplary embodiment.
Figure 6B:
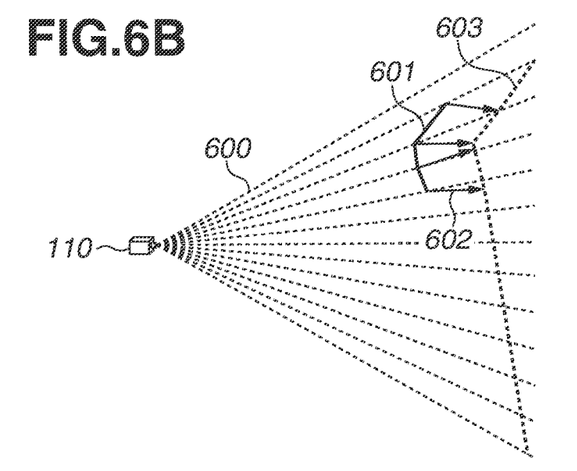
Figure 6C:
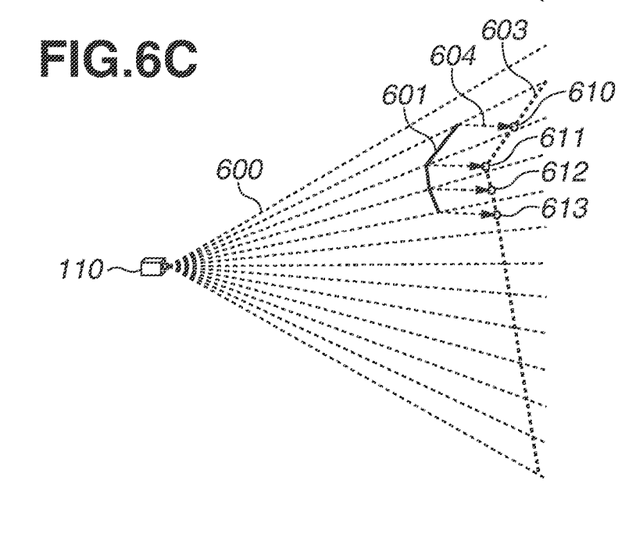
Figure 6D:
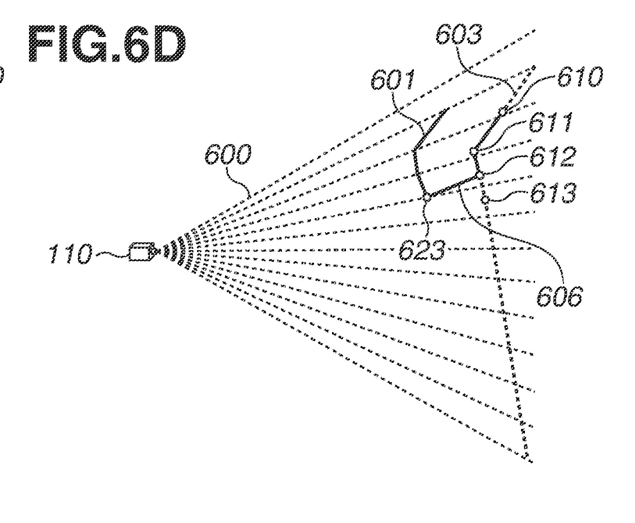
Figure 7:
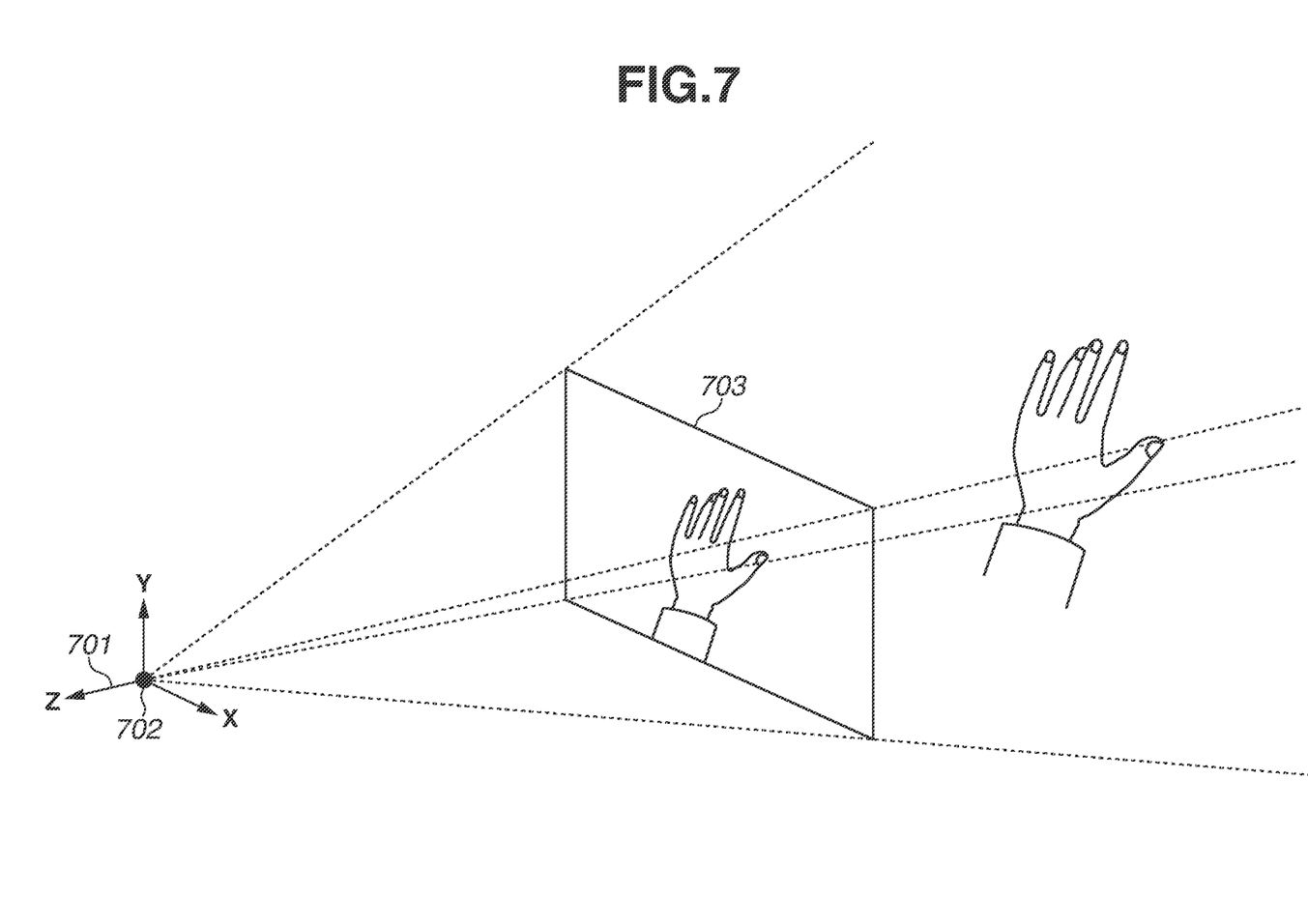
FIG. 7 is a diagram illustrating a view coordinate system.

6A to 6D illustrating one example of a polygon generation method and FIG. 7 illustrating a view coordinate system as appropriate.

In step S501, similar to step S301 described above, the second model generation unit 146 calculates a normal of a front surface model generated by a first model generation unit 145. More specifically, the second model generation unit 146 determines a normal group 602 illustrated in FIG. 6B with respect to a front surface model 601 generated on an image of a front surface of an object captured by an image capturing apparatus 110 as illustrated in FIG. 6A. In each of FIGS. 6A to 6D, a line-of-sight vector 600 is illustrated.

In step S502, similar to step S302 described above, the second model generation unit 146 projects a vertex of the front surface model by a length corresponding to thickness information (a thickness parameter) acquired from a data storage unit 143 in a direction of each normal calculated in step S501. The second model generation unit 146 interpolates and/or extrapolates a vertex-projected position to generate a back surface depth curved surface 406 as illustrated in FIG. 6B.

Subsequent to step S503, the second model generation unit 146 performs processing in steps S504 to S507 for each vertex of the front surface model. The processing ends in a case where all of the vertexes are processed.

In step S504, the second model generation unit 146 generates back surface vertexes 610 to 613 at positions where respective vertexes of the front surface model 601 are projected in a view coordinate system Z-axis opposite direction 604 onto the back surface depth curved surface 603. The view coordinate system used herein is, as illustrated in FIG. 7, a coordinate system in which a principal point 702 is an origin, a width direction and a height direction of an image plane 703 are defined as an X axis and a Y axis, respectively, and a direction toward the principal point 702 from the image plane 703 is a Z-axis. Accordingly, the view coordinate system Z-axis opposite direction 604 is a vector in a direction opposite a Z-axis vector 701.

In step S505, the second model generation unit 146 projects each of the generated back surface vertex and the front surface model onto an image plane.

In step S506, the second model generation unit 146 determines whether the projected back surface vertex overlaps the front surface model. In a case where the second model generation unit 146 determines that the back surface vertex overlaps the front surface model (YES in step S506), the second model generation unit 146 executes a next loop. In a case where the second model generation unit 146 determines that the back surface vertex does not overlap the front surface model (NO in step S506), the processing proceeds to step S507. In step S507, the second model generation unit 146 adjusts a depth of the vertex of the back surface model, which has been determined not to overlap the front surface model, to a depth of the vertex of the front surface model.

In the example illustrated in FIG. 6C, since the back surface vertex 613 does not overlap the front surface model 601, the back surface vertex is moved to an adjusted back surface vertex 623 as illustrated in FIG. 6D. Subsequently, a back surface model 606 with vertexes of back surface vertexes 610, 611, and 612 and the adjusted back surface vertex 623 is generated.

Accordingly, the second model generation unit 146 generates and adjusts a back surface vertex for each vertex of a front surface model, thereby generating a back surface model of a real object of a model target.

According to the second exemplary embodiment, similar to the first exemplary embodiment, a real-object model that enables operation of a CG model with high accuracy in consideration of a thickness of a hand of a real object of a model target and does not provide a feeling of strangeness even if the user looks around the real-object model can be generated.

Therefore, according to each of the above-described exemplary embodiments, a real-object model having appearance that does not cause a user to have a feeling of strangeness that enables operation of a CG model can be generated.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While exemplary embodiments have been described above, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-007958, filed Jan. 21, 2021, which is hereby incorporated by reference herein in its entirety.

What is claimed is:
1. An image processing apparatus comprising:
at least one processor;
a detecting unit;
a first model generation unit; and
a second model generation unit,
wherein the at least one processor detects an area of a target object from an image captured by an image capturing apparatus;
wherein the at least one processor generates a front surface model as a three-dimensional polygon model representing a front surface of the target object based on the area of the target object,
wherein the at least one processor generates a back surface including points provided by movement of a plurality of vertices of polygons of the front surface model by a distance corresponding to a thickness of the target object in respective normal directions and generates a back surface model as a three-dimensional polygon model including vertices at positions where a plurality of vertices of polygons of the front surface model is projected onto the back surface in a predetermined direction, wherein the at least one processor generates an outline of a detection area and a three-dimensional polygon model of an inside of the outline as the back surface model wherein the detecting unit, the first model generation unit and the second model generation unit are implemented by the at least one processor.

2. The image processing apparatus according to claim 1, wherein the points of the back surface are represented as a set of discrete values.

3. The image processing apparatus according to claim 1, wherein the at least one processor projects a vertex of the front surface model onto the back surface in a line-of-sight vector direction.

4. The image processing apparatus according to claim 1, wherein the at least one processor corrects the back surface based on a distance from an end portion of the area of the target object.

5. The image processing apparatus according to claim 1, wherein the at least one processor projects a vertex of the front surface model onto the back surface in a depth direction.

6. The image processing apparatus according to claim 1, wherein the at least one processor projects the front surface model and vertices of the back surface model onto an image plane, and adjusts a depth of the projected vertex of the back surface model in a case where the projected vertex of the back surface model does not overlap the front surface model.

7. The image processing apparatus according to claim 1, wherein the at least one processor derives a back surface depth by projection from the front surface model, and Interpolates a back surface depth that is not derived by projection based on a gradient value of the back surface depth derived by projection.

8. The image processing apparatus according to claim 1, wherein the at least one processor determines contact between the target object and a virtual object based on the front surface model and the back surface model wherein the detecting unit, the first model generation unit, the second model generation unit and the determination unit are implemented by the at least one processor.

9. The image processing apparatus according to claim 1, wherein the at least one processor generates an outline of a decision area and a three-dimensional polygon model of an inside of the outline as the front surface model.

10. The image processing apparatus according to claim 1, wherein the at least one processor generates a vector extending from a vertex of the front surface model in a predetermined direction and a vertex of the back surface model at an intersection of the back surface.

11. The image processing apparatus according to claim 1, wherein the at least one processor determines whether the vertex of the front surface model is present within a predetermined distance from an outline of the front surface model.

12. The image processing apparatus according to claim 11, wherein the at least one processor approximates a depth of the back surface to a depth of the front surface model based on a distance from the end portion of the area of the target object.

13. An image processing method comprising:
    detecting an area of a target object from a captured image captured by an image capturing apparatus;
    generating a front surface model as a three-dimensional polygon model of the target object based on the area of the target object;
    generating a back surface including points provided by movement of a plurality of vertices of polygons of the front surface model by a distance corresponding to a thickness of the target object in respective normal directions; and
    generating a back surface model as a three-dimensional polygon model including vertices at positions where a plurality of vertices of polygons of the front surface model are projected onto the back surface in a predetermined direction, and
    generating an outline of a detection area and a three-dimensional polygon model of an inside of the outline as the back surface model.

14. A non-transitory computer-readable storage medium storing a program for causing a computer to execute an image processing method, the image processing method comprising:
    detecting an area of a target object from a captured image captured by an image capturing apparatus;
    generating a front surface model as a three-dimensional polygon model of the target object based on the area of the target object;
    generating a back surface including points provided by movement of a plurality of vertices of polygons of the front surface model by a distance corresponding to a thickness of the target object in respective normal directions;
    generating a back surface model as a three-dimensional polygon model including vertices at positions where a plurality of vertices of polygons of the front surface model are projected onto the back surface in a predetermined direction, and
    generating an outline of a detection area and a three-dimensional polygon model of an inside of the outline as the back surface model.

* * * * *